Sept. 27, 1932.  W. C. RUTH  1,880,155
CINDER SPREADER
Filed Aug. 26, 1931    2 Sheets-Sheet 1
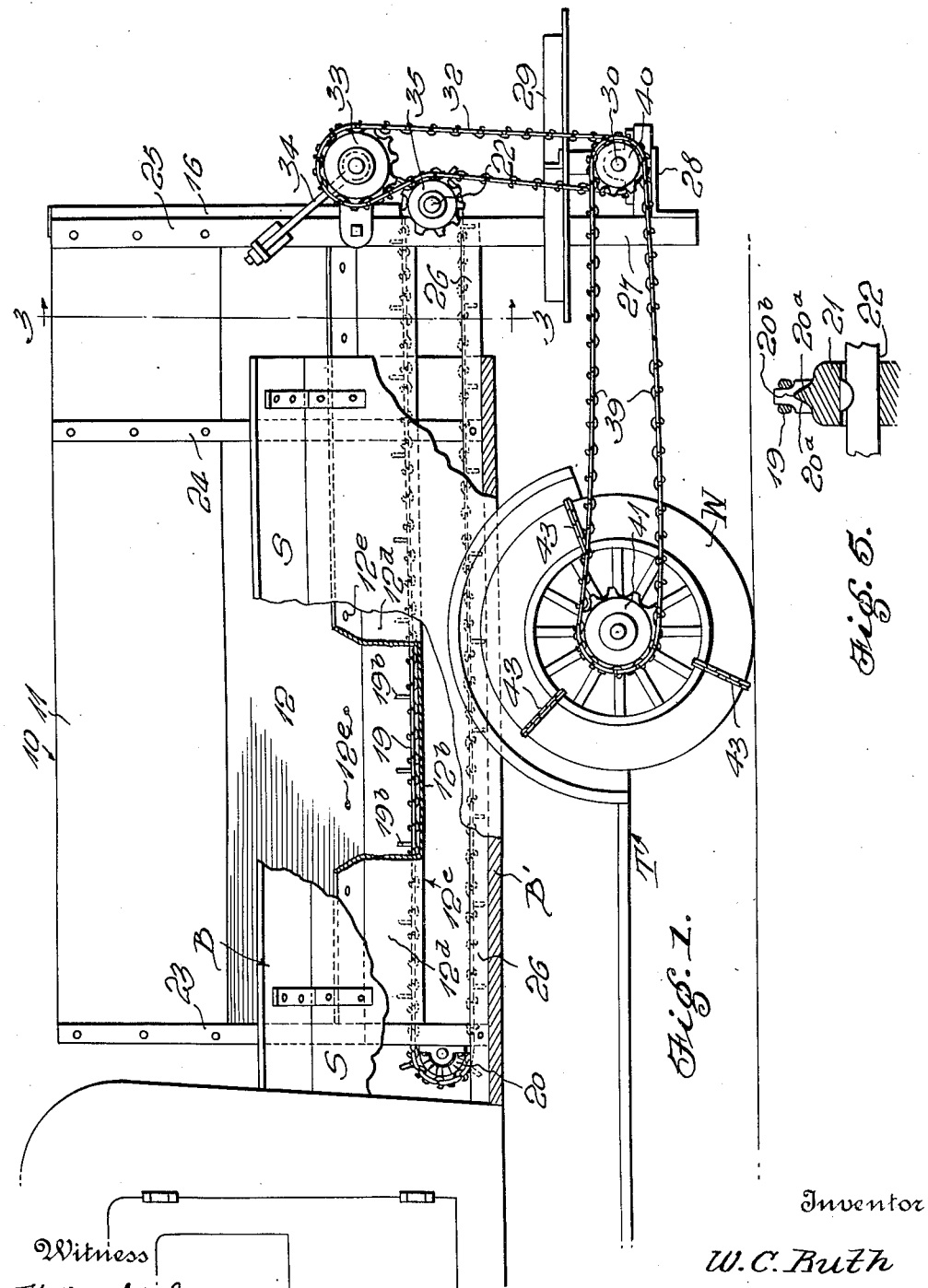
Inventor
W. C. Ruth

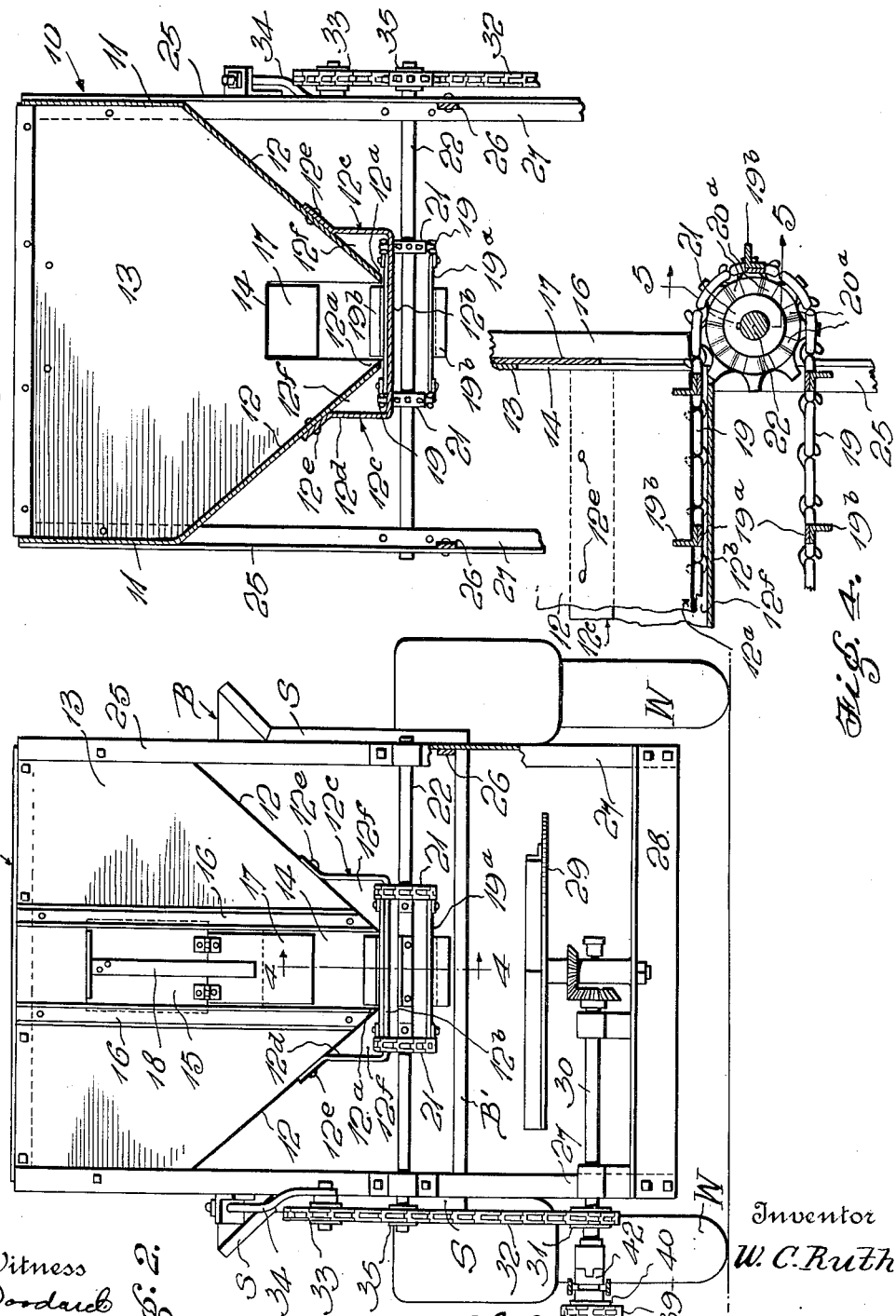

Patented Sept. 27, 1932

1,880,155

UNITED STATES PATENT OFFICE

WILLIAM CHESTER RUTH, OF GAP, PENNSYLVANIA

CINDER SPREADER

Application filed August 26, 1931. Serial No. 559,541.

The invention relates to equipment for spreading cinders, sand, gravel, sawdust, or other granular anti-skidding material on slippery highways, thereby rapidly accomplishing the work now carried out by hand when the roadways have become so slippery as to endanger traffic. The equipment is of such construction that it may be quickly and easily mounted on a conventional truck and driven thereby, and it is of course possible that in smaller sizes, the necessary assembly of parts could be carried by machines lighter than the ordinary truck types.

It is the principal object of the invention to provide a rather simple and inexpensive assemblage for the purpose set forth, yet one which will be highly efficient and reliable.

The hopper which carries the cinders or other material to be spread, is carried within the body of the truck, and the spreading means which is bodily movable with the hopper when placing the device upon or removing it from the truck, is driven from one of the truck wheels, and a further object is to provide for effectively holding the unit formed by the hopper and spreading means, in proper position, without the necessity of bolting or otherwise securing it to the truck body.

Yet another object is to make provision whereby frame structure which supports the hopper in the truck body, may laterally yield to accommodate the invention to truck bodies of slightly varying widths.

An endless conveyor which drags the cinders or the like from the hopper onto a rotary spreader, embodies endless chains and sprockets over which they pass, and further objects are to protect said chains against the material being spread and to prevent packing of said material between the chains and sprockets.

A still further object is to make novel provision whereby relatively large lumps of the material being spread may be discharged instead of possibly clogging the outlet of the hopper.

With the foregoing and minor objects in view, the invention resides in the novel subject matter hereinafter described and claimed, description being accomplished by reference to the accompanying drawings.

Fig. 1 is a side elevation partly broken away and in section.

Fig. 2 is a rear end elevation.

Fig. 3 is a vertical sectional view on line 3—3 of Fig. 1.

Fig. 4 is a detail vertical section on line 4—4 of Fig. 2.

Fig. 5 is a detail transverse sectional view on line 5—5 of Fig. 4.

A preferred construction has been illustrated and will be specifically described, with the understanding however that within the scope of the invention as claimed, variations may be made.

A motor truck T of conventional form is shown, having the usual body B whose rear end may be permanently open or may be opened by removing or downwardly swinging a tail-gate (not shown). For reference hereinafter, the longitudinal side walls of the body B are denoted at S and the bottom of said body is given the reference character B'.

A hopper 10 is provided, preferably of greater length than the body B with which it is to be used, said hopper having vertical side walls 11 and a V bottom 12. Both the front and rear of the hopper are closed, and the rear end wall is denoted at 13, said end wall being provided with a discharge opening 14 at the rear end of the V bottom 12. A vertically slidable gate 15 is provided for controlling the effective size of the opening 14, said gate being adjustably mounted in appropriate guideways 16 and embodying a hinged rearwardly swingable lower section 17 which is normally held in substantially vertical position by a suitable spring 18. As the material is being fed through the opening 14 however, any relatively large lumps of said material which might otherwise clog the outlet, may rearwardly swing the gate section 17 and discharge without interfering with the proper operation.

The lower part of the V-bottom 12 is provided with a longitudinal slot $12^a$ and extending longitudinally under this slot is the bottom $12^b$ of a metal channel $12^c$ the side walls $12^d$ of said channel being secured at $12^e$ to said V-bottom 12, providing longitudinal pockets 12$^f$ between the lower portions of the V-bottom 12 and the channel 12$c$. In these pockets, travel the upper reaches of longitudinal conveyor chains 19, said chains being trained around front and rear sprockets 20 and 21, said rear sprockets being secured to a transverse shaft 22. At intervals, the chains 19 are connected by transverse strips 19$^a$ upon which cleats 19$^b$ are secured for dragging the material from the channel bottom 12$^b$ through the opening 14 onto a rotary spreader hereinafter described.

By disposing the chains 19 in the pockets 12$^f$, they are protected against the abrasive action of the granular material and against becoming clogged with such material. Any material which finds its way between the chains and the sprockets 20 and 21, cannot pack and cause trouble, due to novel construction of said sprockets. Between their teeth, these sprockets are oppositely beveled as seen at 20$^a$, providing rather sharp ridges 20$^b$ which will cut and deflect the material laterally instead of allowing it to pack between the chains and sprockets.

To support the hopper 10 in the body B, side frames are provided, each of said side frames consisting of front, intermediate and rear vertical bars 23, 24 and 25 respectively. These bars are all secured against the the side walls 11 of the hopper and project downwardly therefrom, their lower portions being hence spaced outwardly from the V-bottom 12. The lower ends of the bars 23 and 24 are rigidly secured to a pair of longitudinal bars 26 adapted to rest upon the bottom B' of the body B. The downwardly projecting portions of the bars 23 and 24 are intended to lie against the inner sides of the side walls S of the body B, thereby holding the hopper 10 against lateral shifting. Preferably, the projecting lower portions of the bars 23, 24 and also the bars 26 are free to yield laterally with respect to the hopper 10. Hence, the frame structure formed by said bars is laterally variable in width to allow use with truck bodies whose widths vary slightly.

The bars 25 project downwardly as at 27, below the rear ends of the bars 26 to which they are secured, and the lower ends of said bars 25 are held against relative lateral springing, by a transverse bar 28 which extends between and is secured to said downwardly projecting bar ends 27. A suitable spreading disk 29 and a driving shaft 30 therefor, are mounted upon the transverse bar 28, said disk being positioned to receive the material discharged through the opening 14. Shaft 30 is provided with a sprocket 31 which drives a vertical chain 32, said chain being engaged with the sprocket 33 of a chain tightener 34. Chain 32 also engages a sprocket 35 on the shaft 22. Hence, the conveyor chains 19 and the spreading disk 29 will be driven at predetermined relative speeds when the shaft 30 is driven.

It will be observed that the construction described with the aid of the reference characters 10 to 35 inclusive, constitutes a single unit applicable bodily to the truck T and removable bodily therefrom. This unit is either bolted down or held down by its own weight and the weight of the material within the hopper, is held against lateral shifting by contact of the frame structure with the sides S of the body B, is held against forward shifting by contact of the front end of said frame structure with the front end wall of the truck body, and if not bolted is held against rearward sliding by a chain 39 which is employed for driving the shaft 30 from one of the rear wheels W of the truck T. Chain 39 passes around a sprocket 40 carried by the shaft 30 and around another sprocket 41 which is suitably secured to the wheel W or to the axle thereof. Due to the relation of parts of the above-mentioned unit, the shaft 30 is necessarily behind the wheel W, and in addition to driving said shaft, it will be observed that the chain when so driving, exerts a constant forward pull upon the shaft 30, which pull is transmitted to the frame structure of the aforesaid unit and consequently holds the latter solidly forward. Moreover, even if the spreader is not in operation, the chain 39 will prevent rearward sliding of the entire unit. To throw the spreader out of operation whenever desired, a clutch 42 may be employed for disconnecting the sprocket 40 from the shaft 30. Any suitable shifting means (not shown) may be employed for this clutch.

For a two-fold purpose, the rear wheels W of the truck T are preferably equipped with appropriate lugs 43. These lugs not only provide for effective traction upon the slippery highways over which the anti-skidding material is to be spread, but they cause vertical shaking of the truck and the parts carried thereby. Consequently, this vertical shaking serves to continually jar the cinders or the like downwardly, insuring that they shall slide upon the V-bottom 12 and reach the cleats 19$^b$, instead of arching and allowing the conveyor to travel idly. The action which the lugs 43 have upon the truck, may be readily observed by watching the rear portion of an ordinary motor truck equipped with heavy chains or the like, and traveling upon a hard surface. Heretofore, insofar as I am advised, the vertical shaking of the truck body so produced has always been a drawback rather than an asset, but my invention takes advantage of such shaking to insure proper settling of the cinders or the like onto the conveyor and to hence insure proper feeding of the material through the discharge channel of the hopper, without necessity of making other provision to prevent arching of the cinders or the like in the hopper.

While the details disclosed may be considered as preferred, attention is again invited to the fact that within the scope of the invention as claimed, numerous variations may be made.

I claim:—

1. In combination with a truck whose body is open at its rear end; a hopper resting in said body, a spreader receptively related with said hopper, a spreader-driving sprocket, and means holding said hopper, spreader and sprocket assembled into a bodily-movable unit, said sprocket of said unit being rearwardly spaced from a rear wheel of the truck; a second sprocket rotatable unitarily with said wheel, and a chain trained around said sprockets, whereby said chain will exert a forward pull on said unit and may alone hold the latter against rearward sliding, said unit engaging the side walls of said body to prevent lateral shifting of said unit and having a portion abutting the front wall of said body to prohibit forward sliding of said unit.

2. An assembly of the class described comprising a hopper provided with material spreading means, and two side frames extending longitudinally of and projecting downwardly from said hopper, said frames being adapted to rest upon the bottom of a truck body and to lie against the side walls of said body.

3. An assembly of the class described comprising a horizontally elongated hopper having vertical longitudinal side walls and a V bottom, vertical bars secured against said side walls and projecting downwardly therefrom, longitudinal bars secured to the lower ends of said vertical bars and adapted to rest upon a truck body bottom, means for rearwardly feeding material from said hopper bottom, and means for spreading the rearwardly fed material.

4. An assembly of the class described comprising a horizontally elongated hopper having vertical longitudinal side walls and a V bottom, vertical bars secured against said side walls and projecting downwardly therefrom, longitudinal bars secured to the lower ends of said vertical bars and adapted to rest upon a truck body bottom, relatively long vertical bars secured to the rear end of the hopper and to the rear ends of said longitudinal bars and projecting downwardly from the latter, a transverse bar extending between and secured to the lower ends of said relatively long vertical bars, a spreader mounted on said transverse bar, and means for feeding the material rearwardly from the hopper bottom to said spreader.

5. An assembly of the class described comprising a hopper provided with material spreading means, and two side frames extending longitudinally of and projecting downwardly from said hopper, said frames being adapted to rest upon the bottom of a truck body and being laterally resilient to frictionally abut the side walls of said body.

6. An assembly of the class described comprising a hopper provided with material spreading means, front, rear and intermediate bars secured to and projecting downwardly from said hopper, the front and intermediate bars being laterally resilient, the rear bars projecting further downward than said front and intermediate bars, a transverse bar extending between and secured to the lower ends of said rear bars and holding them against lateral springing, longitudinal bars secured to the lower ends of said front and intermediate bars and adapted to rest upon the bottom of a truck body, said longitudinal bars being secured at their rear ends to said rear bars and being resilient, spreading means mounted on said transverse bar, and means for feeding the material rearwardly from the hopper to said spreading means.

7. An assembly of the class described comprising a hopper provided with material spreading means, front, rear and intermediate bars secured to and projecting downwardly from said hopper, the rear bars projecting further downward than said front and intermediate bars, a transverse bar extending between and secured to the lower ends of said rear bars, longitudinal bars secured to the lower ends of said front and intermediate bars and adapted to rest upon the bottom of a truck body, said longitudinal bars being secured at their rear ends to said rear bars, and spreading means mounted on said transverse bar.

8. An assembly of the class described comprising a hopper having a V-bottom and an end wall at one end thereof, said end wall having a discharge opening, conveying means in the V of said bottom for feeding material from said hopper through said discharge opening, a vertically slidable gate mounted on said end wall for controlling the effective size of said discharge opening, said gate having a rearwardly swingable lower section to allow large lumps of the material to pass, and spring means for yieldably resisting rearward swinging of said lower gate section.

9. An assembly of the class described comprising a hopper having a V-bottom whose lowermost part is provided with a longitudinal discharge slot, a longitudinal channel whose bottom underlies said slot and is of greater width than the latter, the side walls of said channel being secured to said V-bottom along lines spaced above said slot, whereby longitudinal pockets are provided at the outer side of said V-bottom in the corner portions of said channel, chains having upper reaches in said pockets respectively, conveying means connecting said chains and adapted to travel along said bottom of said channel, and mounting and driving means for said chains, said hopper having an outlet at one end of said channel.

In testimony whereof I affix my signature.

WILLIAM CHESTER RUTH.